(12) United States Patent
Mitjans et al.

(10) Patent No.: US 9,325,084 B2
(45) Date of Patent: Apr. 26, 2016

(54) ANNULAR COUPLER FOR DRILL STEM COMPONENT

(75) Inventors: Beranger Mitjans, Versailles (FR);
Franck Moukanda Mbango, Tottenham (GB); Roland Amiel, Cannes (FR)

(73) Assignee: VALLOUREC DRILLING PRODUCTS FRANCE, Cosne-Cours-sur-Loire (FR)

( * ) Notice: Subject to any disclaimer, the term of this patent is extended or adjusted under 35 U.S.C. 154(b) by 269 days.

(21) Appl. No.: 14/002,372

(22) PCT Filed: Feb. 28, 2012

(86) PCT No.: PCT/EP2012/053357
§ 371 (c)(1),
(2), (4) Date: Dec. 5, 2013

(87) PCT Pub. No.: WO2012/116983
PCT Pub. Date: Sep. 7, 2012

(65) Prior Publication Data
US 2014/0080338 A1    Mar. 20, 2014

Related U.S. Application Data

(60) Provisional application No. 61/533,335, filed on Sep. 12, 2011.

(30) Foreign Application Priority Data

Mar. 1, 2011    (FR) ..................................... 11 00611

(51) Int. Cl.
*H01R 4/60*    (2006.01)
*H01R 4/56*    (2006.01)
(Continued)

(52) U.S. Cl.
CPC ................ *H01R 4/56* (2013.01); *E21B 17/028* (2013.01); *F16L 9/02* (2013.01)

(58) Field of Classification Search
USPC ..................... 439/191–194; 340/855.1, 854.8
See application file for complete search history.

(56) References Cited

U.S. PATENT DOCUMENTS 2,178,931 A * 11/1939 Crites et al. ................... 439/191
3,518,609 A *  6/1970 Fontenot, Jr. ................. 439/191
4,690,212 A     9/1987 Termohlen
(Continued)

OTHER PUBLICATIONS

International Search Report issued Jul. 16, 2012 in PCT/EP12/053357 filed Feb. 28, 2012.

*Primary Examiner* — Neil Abrams
(74) *Attorney, Agent, or Firm* — Oblon, McClelland, Maier & Neustadt, L.L.P.

(57) ABSTRACT

A pair of contact or capacitive HF couplers for drill stem components. Each of the first and second couplers includes a central conductor, a supplemental conductor, and an annular dielectric mechanism. The dielectric mechanism is disposed between the conductors. The conductors are isolated from each other. The supplemental conductor includes two electrical contact surfaces. The central conductor includes an electrical contact surface or electrode such that the couplers are capacitive. The central conductors of the first and second couplers interact electrically in the coupled state. The supplemental conductors of the first and second couplers are in electrical contact in the coupled state. The supplemental conductors surround the central conductors. In the mounted state, the supplemental conductors form a shielding for the central conductors.

14 Claims, 8 Drawing Sheets

(51) Int. Cl.
*E21B 17/02* (2006.01)
*F16L 9/02* (2006.01)

(56) References Cited

U.S. PATENT DOCUMENTS

| | | | | |
|---|---|---|---|---|
| 6,670,880 B1 * | 12/2003 | Hall et al. | | 336/132 |
| 6,717,501 B2 * | 4/2004 | Hall et al. | | 336/132 |
| 6,866,306 B2 * | 3/2005 | Boyle et al. | | 285/333 |
| 6,929,493 B2 * | 8/2005 | Hall et al. | | 439/191 |
| 6,968,611 B2 * | 11/2005 | Hall et al. | | 29/745 |
| 7,002,445 B2 * | 2/2006 | Hall et al. | | 336/132 |
| 7,201,240 B2 * | 4/2007 | Hall et al. | | 175/320 |
| 7,362,235 B1 * | 4/2008 | Normann et al. | | 340/854.8 |
| 7,535,377 B2 * | 5/2009 | Hall et al. | | 340/854.8 |
| 8,735,743 B2 * | 5/2014 | Harmon et al. | | 174/520 |
| 2005/0001738 A1 * | 1/2005 | Hall et al. | | 340/854.8 |
| 2005/0074988 A1 | 4/2005 | Hall et al. | | |
| 2005/0279508 A1 | 12/2005 | Hall et al. | | |
| 2006/0021799 A1 | 2/2006 | Hall et al. | | |
| 2006/0108803 A1 | 5/2006 | Reynolds | | |
| 2007/0227757 A1 | 10/2007 | Moore | | |
| 2007/0284873 A1 | 12/2007 | Funke | | |
| 2008/0003894 A1 | 1/2008 | Hall et al. | | |
| 2008/0220664 A1 | 9/2008 | Hall et al. | | |
| 2014/0034393 A1 * | 2/2014 | Mitjans | | E21B 17/028 175/320 |
| 2014/0080338 A1 * | 3/2014 | Mitjans | | E21B 17/028 439/192 |

* cited by examiner

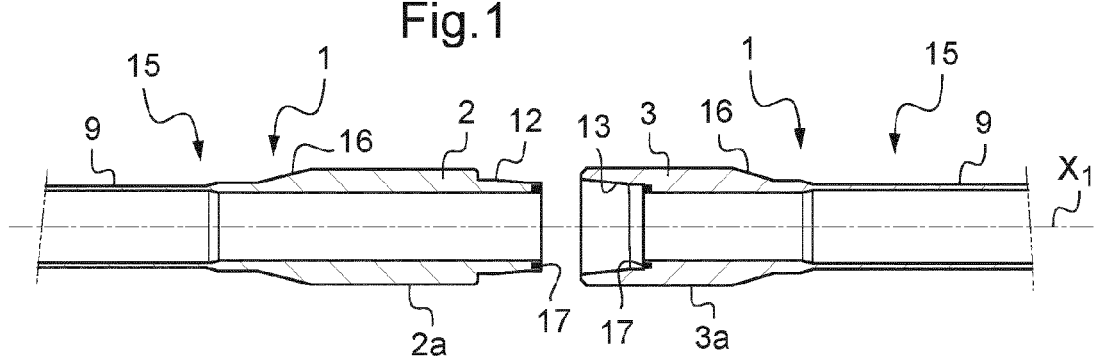
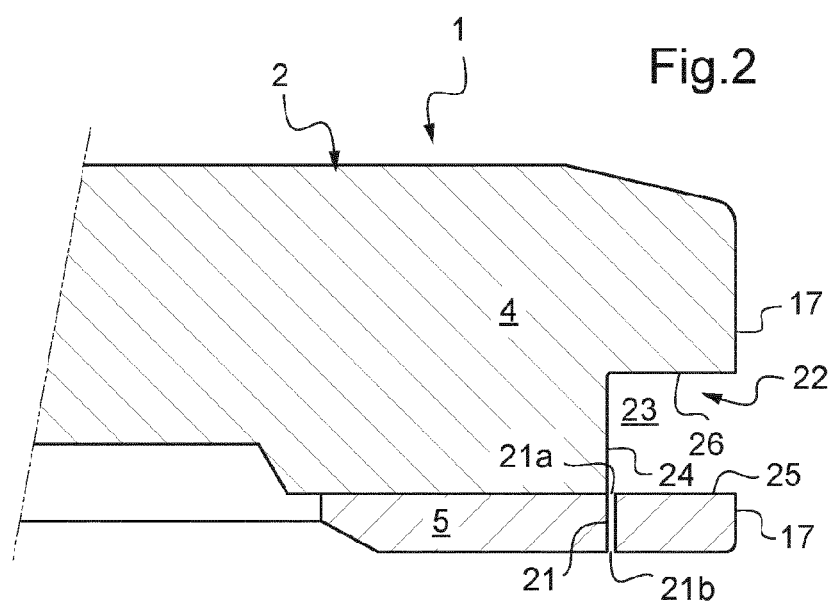

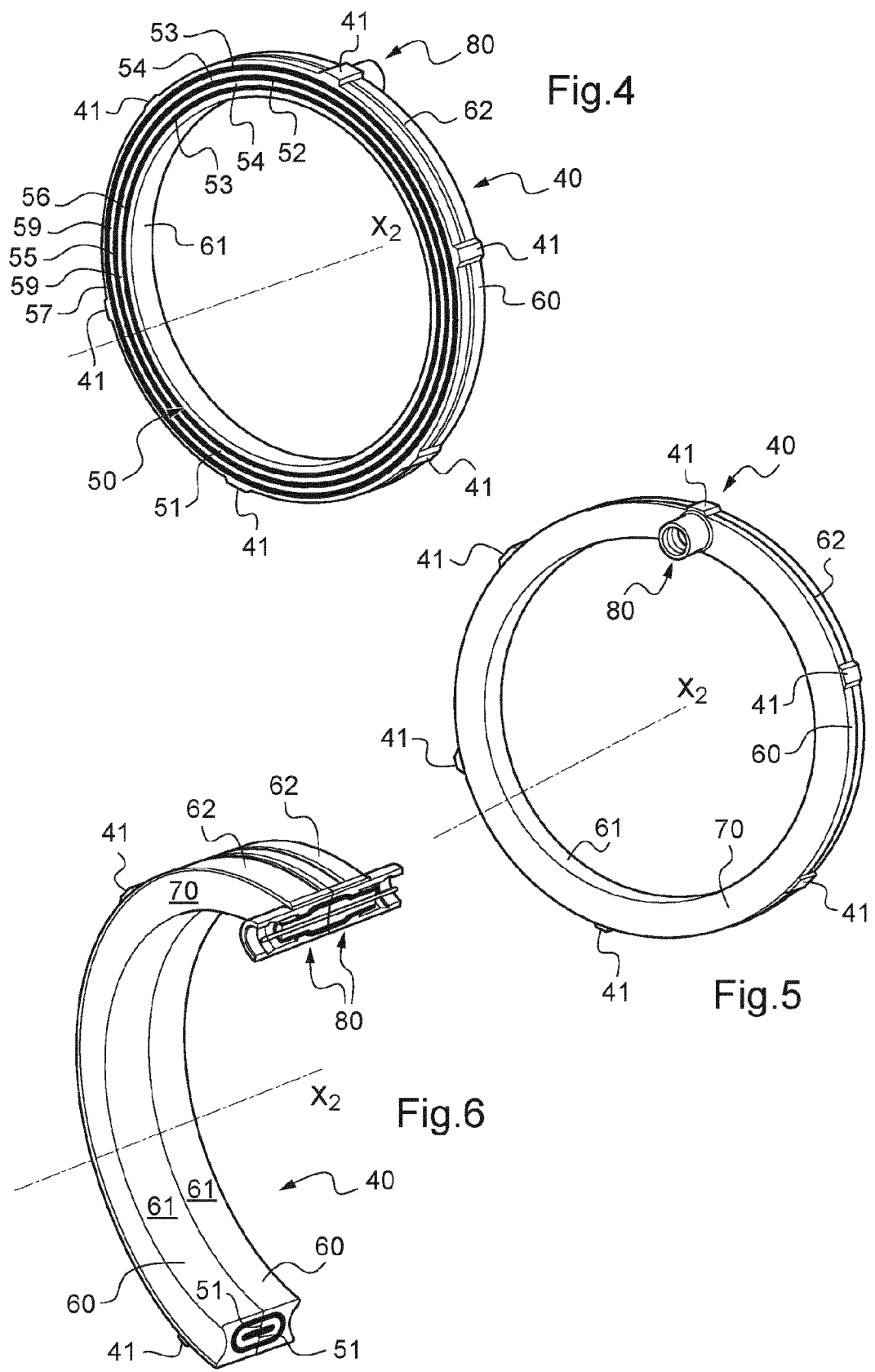

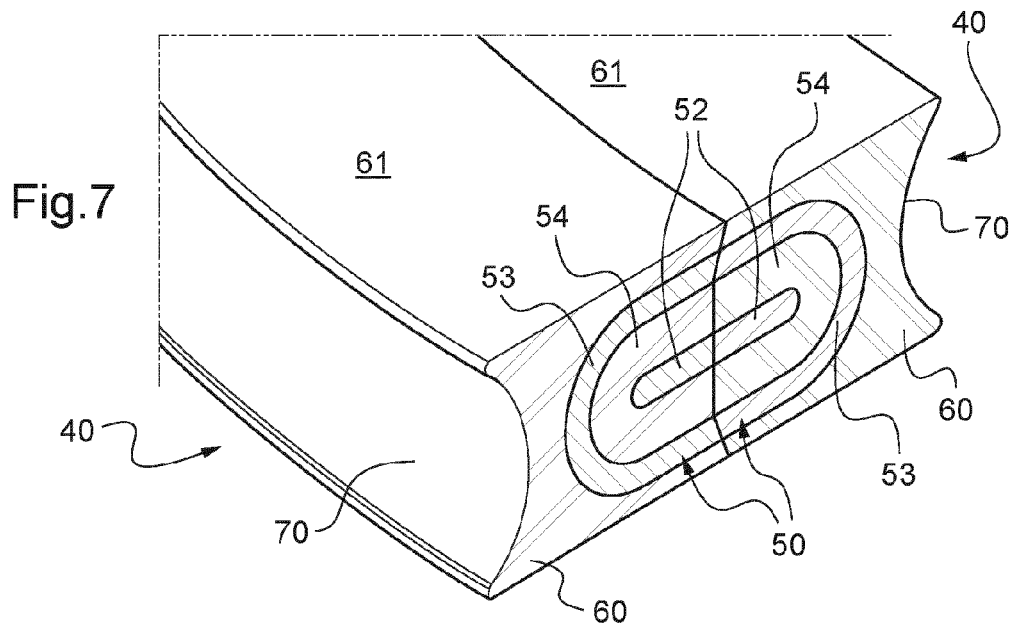
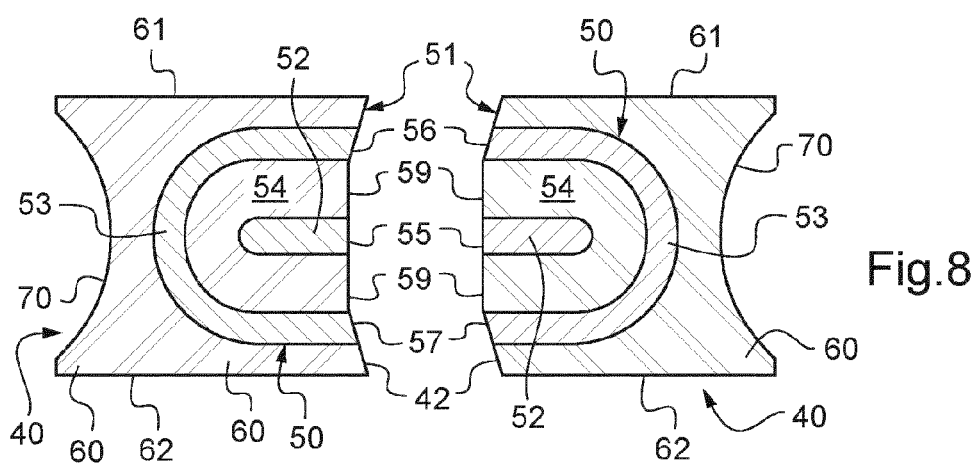
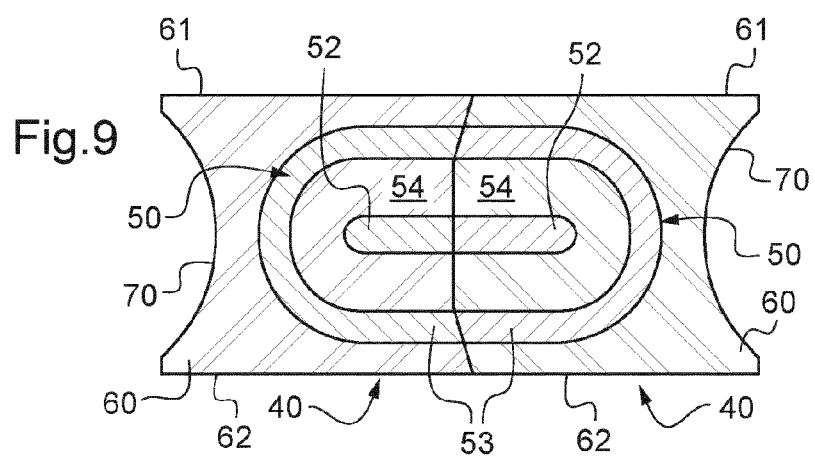

ANNULAR COUPLER FOR DRILL STEM COMPONENT

The invention relates to the field of the search for and operation of oil or gas fields. Rotary drill strings are used therein, constituted by tubular components such as standard drill strings and possibly heavy weight drill strings as well as other tubulars. The expression "drill string" will be used here, even if only one tube is involved, for the passage for mud under pressure in order to actuate a drill bit at the well bottom. The drill string may be rotary with respect to the casing of the well.

More particularly, the invention pertains to a coupler for a cabled tubular component. Such couplers can be used to transmit information from one end of a component to the other end of another component.

In order to provide a better understanding of the events occurring at the bottom of a hole, downhole assemblies in the vicinity of the bit may be provided with measuring instruments. The measured data are communicated to the surface for processing. Data transfer is generally carried out via a communication cable housed in a communication line along the components and by the interaction of transmission means or couplers between two successive components at their respective ends. Known contact transmissions are subject to wear and cannot guarantee sufficient service use. The use of such devices is sensitive to large deformations of the tubular components in operation. Especially at their mutual junctions, the components are subjected to expansion, tension, compression, bending, torsion and/or vibration.

A variety of different transmission means are known in the art as described in particular in the documents US-2005-074988 and US-2005-001738.

The invention will improve the situation.

The pair of first and second contact couplers for drill stem components may be HF. Each of the first and second couplers comprises a central conductor, a supplemental conductor and a dielectric means. The dielectric means is annular and disposed between said central and supplemental conductors. Said central and supplemental conductors are isolated from each other. The supplemental conductor comprises two electrical contact surfaces. The central conductor comprises an electrical contact surface. The central conductors of the first and second couplers are in electrical contact, in the coupled state. The supplemental conductors of the first and second couplers are in electrical contact in the coupled state. The supplemental conductors surround the central conductors. In the mounted state, the supplemental conductors form a shielding for the central conductors. The supplemental conductors improve confinement of the electric field in the structure. Each of the supplemental conductors may be surrounded by an insulating support in order to electrically insulate the supplemental conductors from the components of the drill stem.

A pair of capacitive HF couplers may be provided for the components of the drill stem, each of the first and second couplers comprising a central conductor, a supplemental conductor and an annular dielectric means disposed between the central conductor and the supplemental conductor, the central conductor and the supplemental conductor being isolated from each other, the supplemental conductor comprising two electrical contact surfaces, the central conductor comprising an electrode surface, each of the central conductors of the first and second couplers being in remote electrical interaction in the coupled state, each of the supplemental conductors of the first and second couplers being in electrical contact, in the coupled state, the supplemental conductors surrounding the central conductors, the supplemental conductors forming, in the mounted state, a shielding for the central conductors. The central conductors may be annular in shape with a longitudinal thickness inferior to their radial width.

The annular couplers in the coupled state can form a coaxial cable in the form of a toroid of revolution, for example a toroid or a shape generated by an ellipse or a rectangle. The electromagnetic characteristics of the coaxial cable extend over the connections of the two components of a drill string.

The shielding may be electromagnetic. This at least partially preserves the quality of transmission over interference present in the connection. The shielding may have a substantially rectangular periphery in axial section.

The central conductor may have two axial faces, internal and external. The distance between said two axial faces, or radial thickness, may be of the order of 10% to 40% of the distance between the other faces joining the axial faces. The radial thickness or radial width "1r" of the central conductor represents 10% to 40% of the longitudinal thickness "e" in embodiments in which there is direct contact between the central conductors.

The central conductor may have a T-shaped cross section. The T comprises a radially orientated cross-bar and an axially orientated foot. The cross-bar may have a thickness inferior to that of the foot.

The central conductor may comprise an annular metallized layer. The metallized layer can form an electrical contact surface or a surface of an electrode. In the case of capacitive couplers, the electrode surfaces are separated by at least one dielectric element. The dielectric element may comprise a ring comprising zirconia or PEEK. The dielectric element may support a metallized layer, for example with a longitudinal thickness in the range 10 to 100 micrometers.

The profile of the supplemental conductors, in section in a longitudinal plane, may be U-shaped. The contact of the ends of the arms of the U during assembly of two complementary couplers forms a substantially circular cross section, reducing transmission losses.

The profile of the supplemental conductors in section in a longitudinal plane in the coupled state may be closed. The shielding formed by the supplemental conductor around the central conductor is improved.

The profile of the dielectric means in section in a longitudinal plane may be U-shaped. The dielectric means are consequently matched to the shapes of the two conductors. The dielectric means may have a constant thickness in axial section.

The profile of the dielectric means in section in a longitudinal plane in the coupled state may be closed. The insulation between the two conductors is thus improved.

The supplemental conductors may each be surrounded by an insulating support leaving an annular coupling surface free. The supplemental conductors are electrically insulated from their environment, and in particular electrically insulated from the components of the drill stem in which they are mounted, since drill stems are usually produced from electrically conductive materials and are themselves in contact with the rock formation or with conductive fluids. Thus, continuous shielding is obtained, and thus a uniform mass along the drill string, this mass not varying as a function of the liquid passing through these drill stem components or of electrical contacts with the rock formation. This mass is common to each electrical coupling along a drill string equipped in this manner.

The insulating support may have a deformable structure and comprise a deformable material and at least a structure and a material for which deformation predominates over volume reduction. The insulating support thus at least partially absorbs deformations on makeup and tightening and vibrations in operation.

At least one of the couplers of the pair of couplers may also comprise at least one annular seal disposed at least partially in a cavity, the cavity being formed by axially setting back the dielectric means with respect to the central and supplemental conductors.

The device and the mounting method can be used to preserve the interaction between two transmission means disposed respectively on a first and a second component. Thus, the transmission of information between the hole bottom and the surface is facilitated.

Other characteristics and advantages of the invention will become apparent from an examination of the following detailed description and the accompanying drawings in which:

FIG. 1 is a longitudinal sectional view of two tubular components;

FIG. 2 is a detailed half-sectional view of a connector;

FIG. 4 is a perspective view of an annular coupler;

FIG. 5 is a perspective view of an annular coupler in the opposite orientation to that of FIG. 4;

FIG. 6 is a perspective view of a longitudinal section of a pair of coupled couplers;

FIG. 7 is a detailed view of FIG. 6;

FIG. 8 is a diagrammatic half-view in longitudinal section of a pair of couplers disposed face to face;

FIG. 9 is a diagrammatic half-view in longitudinal section of the pair of couplers of FIG. 8 in the coupled state;

Figure 3:
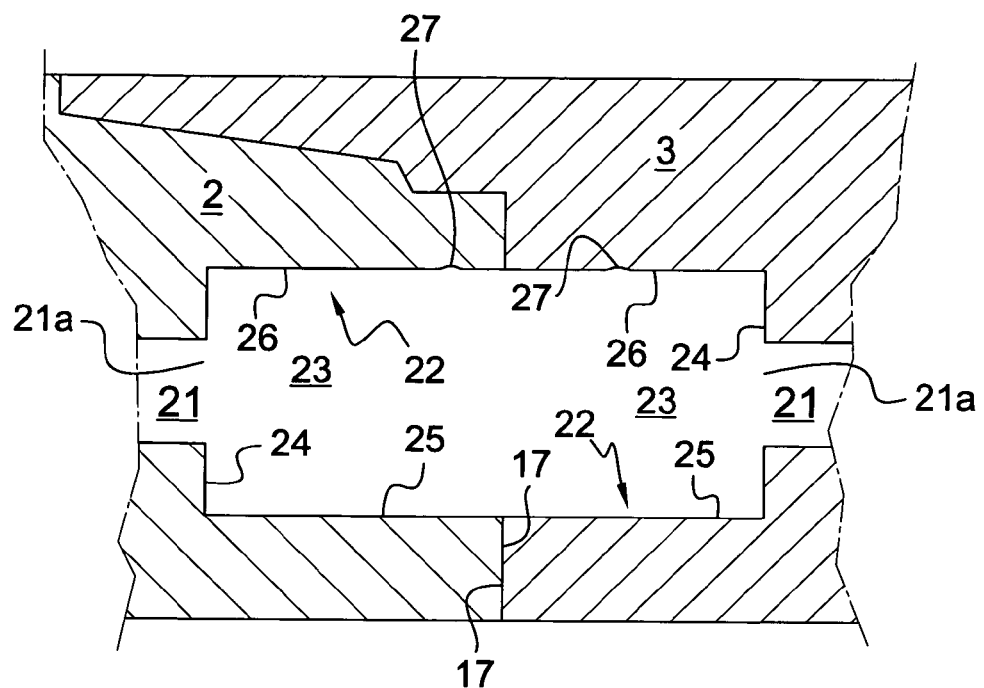
FIG. 3 is a detailed half-sectional view of a junction between the connectors of two tubular components in accordance with a variation; the couplers have not been shown.

The accompanying drawings are at least partially specific in nature and may not only serve to complete the invention, but also to contribute to the definition if necessary.

A drill stem may comprise a plurality of pipes, especially standard pipes obtained by coupling, by welding, a first connector (or male/female end zone) of a great length tube and a second connector (or female/male end zone) on the side opposite to the first connector to form leak-proof threaded tubular connections by coupling, and possibly heavy weight pipes. A pipe may be of any type from several that comply with specification API 7 from the American Petroleum Institute or the manufacturer's own designs. The drill string may be of the type described in documents U.S. Pat. No. 6,670,880, U.S. Pat. No. 6,717,501, US 2005/0115717, US 2005/0092499, US 2006/0225926, FR 2 883 915, FR 2 936 554 or FR 2 940 816.

The term "substantially" as used below takes into account the usual tolerances in the technical field under consideration. The term "in the mounted state" as used below means "the elements constituting the first component are mounted together and ready to be assembled with a second component". The term "coupled" is used below to mean "interacting with the complementary elements of a second component similar to the first", the couplers principally being intended to be used in pairs and the components to be assembled together. The term "high frequency" or "HF" as used here means frequencies of 100 kHz or more.

The male connector of the drill string comprises a male threading provided on an external surface, which is substantially tapered, for example. The male connector also comprises a bore, an external surface, an annular surface, for example substantially radial, between the male threading and the external surface, and an end surface, for example substantially radial. The bore and the external surface may be cylindrical bodies of revolution and be concentric. The male end zone is connected to the tubular body or central portion via a substantially tapered internal surface and a substantially tapered external surface. The bore of the central portion may have a diameter which is greater than the diameter of the bore of the male section and the female section. The external diameter of the central portion may be less than the diameter of the external face of the male connector and the female connector. The female connector comprises internal surfaces which are at least partially complementary to the male connector surfaces so that it can be made up with a similar male connector of another tubular component of the drill stem.

When digging a well, a drill stem is suspended in the well. The drill stem is composed of tubular components coupled together one after the other and comprises a bottom hole assembly. A component may include measurement sensors, measuring the pressure, temperature, stress, inclination, resistivity, etc, for example. The drill stem may comprise standard length tubes, for example 10 meters in length, and instrumentation components.

A cabling system may be used to form a communication line from one connector to the other of a component, see US 2006/0225926. The two connectors of a drilling component may each be equipped with a transmission means or coupler. The couplers of a component are connected by cabling, substantially over the length of the component. A cable is disposed in a sheath or protective tube, together being termed the communication line. The communication line is generally inserted in a hole provided in the thickness of the connectors of the component. In a central portion of the component, the communication line is disposed in the bore of said component because the wall of the central portion is thinner than the walls of the connectors.

The device can be used to improve the behaviour over time of data transmission from one component to another. The coupler for the drill stem component is improved, has less wear, especially when the drill stem is under high mechanical stress, under tension, under compression, under torsion and/or when buckling, and under varied pressures, both internal and external, varied temperatures, vibrations and shocks. The coupler provides better quality and a better data transmission rate.

The device may be capable of being adapted to existing tubular components, as it is capable of being fitted during maintenance operations.

Producing a housing in zones which are mechanically non-critical for the primary tube means that expensive certification and/or conformity tests can be dispensed with. As an example, the integrity of the sealing surfaces is preserved.

The tubular component 1 of the drill stem comprises a first connector 2, a second connector 3 and a central portion 9 extending along a principal axis X1, see FIG. 1. The tubular component 1 is formed from a leak-proof structure and material. The sub-assembly formed by the connectors 2, 3 and the central portion 9 in this case is termed the primary tube 15.

The term "longitudinal plane" is used to denote a plane comprising the principal axis X1 of the component 1. The term "radial plane" is used to denote a plane substantially perpendicular to the principal axis X1 of the component 1.

Said central portion 9 is elongate in shape over a length of 5 to 15 meters for great length components, for example a drill pipe, and 1 to 5 meters for short components, for example wear inserts used at the well head. The internal and external diameter may vary or be constant along the principal axial direction X1. The thicknesses may vary. The bore may be constant. The internal diameter may, for example, be 100 to 400 mm and the external diameter may be 130 to 500 mm.

The central portion 9 is formed from steel. The central portion 9 may comprise an alloy of aluminium, titanium or a composite comprising a polymer filled with reinforcing fibres. The central portion 9 may be a tube obtained by a continuous casting technique. The primary tube 15 may be the result of friction welding each of the connectors 2, 3 either side of the tube forming the central portion 9. The ends of the central portion 9 may be thickened in order to increase the radial welding surface. Said thickening may be carried out on the external side of the wall forming the central portion 9, leaving a constant diameter bore. In this case, the connector 2 is male and the connector 3 is female. The first connector 2 may be female. The second connector 3 may be male.

In the embodiment shown in FIG. 1, the left hand component 1 comprises a male connector 2. The right hand component 1 comprises a female connector 3. This is suitable for an assembly of a drill stem comprising a succession of components 1 of the male-female or integral type. In another embodiment, the primary tubes 15 may have two distinct types coupled in an alternating manner and repeating along a drill stem, one component comprising two male ends, then a coupling comprising two female ends. This is suitable for coupling a drill stem comprising a succession of components of the male-male and female-female type.

The first and second connectors 2, 3 are formed from steel. The first and second connectors 2, 3 are generally tubular in shape. The first and second connectors 2, 3 are fixed either side of the central portion 9. Said connectors 2, 3 have an external diameter which is larger than that of the central portion 9, by 110% to 130%, for example. Said connectors 2, 3 have an internal diameter of less than that of the central portion 9, by 90% to 95%, for example. The external surfaces 2a, 3a of the connectors 2, 3 comprise a tapered shoulder 16. The tapered shoulder 16 is positioned axially to the side of the central portion 9. The tapered shoulder 16 is located between the large diameter external surface 2a, 3a of the connector 2, 3 and the small diameter external surface of the central portion 9. The thickness of the wall constituting the connectors 2, 3 is generally substantially greater than that of the wall constituting the central portion 9. This excess thickness means that supplemental machining can be carried out. The connector 2 comprises a male threading 12, in its external surface 2a, on the side axially opposite to the central portion 9. The connector 3 comprises a female threading 13 in its internal surface on the side axially opposite to the central portion 9. In a variation, the internal diameter of the connectors 2, 3 may be slightly greater than that of the central portion 9.

The male/female connectors 2, 3 and more particularly their respective male/female threading 12, 13, are adapted to interact by making up with a female/male connector 3, 2 of a compatible second tubular component 1 intended to be attached to the first component 1 to form a drill stem. The male/female connector 2, 3 generally comprises a shoulder 17 that can interact with another shoulder 17 of the corresponding female/male connector 3, 2 of the complementary second tubular component 1, for example to stop makeup. The shoulder 17 may be an annular sealing surface.

The first connector 2 of the tubular component 1 comprises an annular groove 23, see FIG. 2. The annular groove 23 is substantially circular with its axis substantially identical with the principal axis X1 of the tubular component 1. The annular groove 23 is provided from the shoulder 17. In the embodiments shown, the tubular components 1 comprise annular grooves 23 on each of their connectors 2, 3. The annular groove 23 comprises a bottom surface 24. The annular groove 23 comprises an internal lateral surface 25. The annular groove 23 comprises an external lateral surface 26. The subassembly comprising the bottom surface 24, the internal lateral surface 25 and the external lateral surface 26 form a cylinder 22. The annular groove 23 designates the open space of the cylinder 22. The annular groove 23 may be defined by the cylinder 22 and a plane containing the shoulder 17.

The tubular component 1 comprises a channel 21, see FIG. 2. The channel 21 comprises a first mouth 21a and a second mouth 21b. The channel 21 is disposed in the first connector 2 of the component 1. The first mouth 21a of the channel 21 communicates with the annular groove 23. The second mouth 21b of the channel 21 communicates externally of the annular groove 23. The second mouth 21b of the channel 21 may be located in the bore of the tubular component 1. In accordance with an option which is not shown, the second mouth 21b of the channel 21 may open at the external surface 2a of the connector 2. The first mouth 21a of the channel 21 may open into the internal lateral surface 25. The channel 21 places the annular groove 23 in fluid communication with a volume located outside the annular groove 23. In other words, the channel 21 maintains equal pressure between the annular groove 23 and a volume outside the annular groove 23 in operation. The channel 21, and more precisely its first mouth 21a, are arranged so that its opening into the annular groove 23 is not blocked in operation. In operation, the mouth 21a is free. The channel 21 in this case is substantially radial in the component 1. The mouth 21a of the channel 21 is close to the bottom surface 24. The component 1 may comprise a plurality of channels 21. In one embodiment, the first mouth 21a of the channel 21 may open into the bottom surface 24, see FIGS. 3 and 10. The channel 21 is then partially longitudinal.

The bottom surface 24 is substantially perpendicular to the principal axis X1 of the tubular component 1. The bottom surface 24 is in the form of a collar. The bottom surface 24 may be planar or tapered. The bottom surface 24 may comprise a groove in which the mouth 21a of the channel 21 is placed. The groove may be rectangular in section.

The internal lateral surface 25 is a surface of revolution having, as its central axis, an axis that is substantially identical with the principal axis X1. The internal lateral surface 25 has the shape of a section of a cylinder having the principal axis X1 as its axis. The radius of said cylindrical section is that of the smallest radius of the annular groove 23. The internal lateral surface 25 may extend substantially perpendicular to the bottom surface 24. The connection between the bottom surface 24 and the lateral internal surface 25 is at a right angle. The connection between the bottom surface 24 and the internal lateral surface 25 may be acute or obtuse. The connection between the bottom surface 24 and the internal lateral surface 25 may comprise a connecting fillet. The internal lateral surface 25 may be tapered. The internal lateral surface 25 may comprise reliefs for holding a coupler 40.

The external lateral surface 26 is a surface of revolution having a central axis which is substantially identical with the principal axis X1. The external lateral surface 26 takes the form of a section of a cylinder having the principal axis X1 as its axis. The radius of said cylindrical section is that of the largest radius of the annular groove 23. The external lateral surface 26 may extend substantially perpendicular to the bottom surface 24. The connection between the bottom surface 24 and the external lateral surface 26 is at a right angle. The connection between the bottom surface 24 and the external lateral surface 26 may be acute or obtuse. The connection between the bottom surface 24 and the external lateral surface 26 may include a connecting fillet. The external lateral surface 26 may be tapered. The external lateral surface 26 may comprise reliefs for holding a coupler 40.

The terms "internal" and "external" are used since the radius of revolution of the external lateral surface 26 is strictly greater than the radius of revolution of the internal lateral surface 25. The two lateral surfaces 25, 26 of the annular groove 23 are orientated inwardly of the annular groove 23. The difference in the radius of revolution between the lateral surfaces 25, 26 defines the width of the annular groove 23.

The internal lateral surface 25 and the external lateral surface 26 are substantially parallel to each other. The internal lateral surface 25, the external lateral surface 26 and the bottom surface 24 are substantially concentric with the principal axis X1.

The first connector 2 may be composed of at least two assembled parts, see FIG. 2. The first connector 2 may comprise a massive portion 4 and an internal ring 5. The massive portion 4 comprises the bottom surface 24 and the external lateral surface 26. The internal ring 5 comprises the internal lateral surface 25. The massive portion 4 and the internal ring 5 each comprise a portion of the shoulder 17; they are mutually axially aligned. In one embodiment, the channel 21 is substantially radially located in the internal ring 5. This embodiment means that the channel 21 can be machined in one part, in this case the internal ring 5, before assembling it, in this case with the massive portion 4. In operation, the annular groove 23 is at the same pressure as the interior of the component 1.

In accordance with another embodiment which is not shown, the annular groove 23 may be formed in the connector 2 by introducing a lining into a bore of the connector 2. The external lateral surface 26 is included in a section of said bore which is left free. The internal lateral surface 25 is included in said lining. The bottom surface 24 may be included in said connector 2 or said lining. This embodiment means that the channel 21 can be machined in one part, in this case the lining, before it is assembled with the connector 2. In operation, the annular groove 23 is at the same pressure as the interior of the component 1.

In another mode, not shown, the channel 21 is provided in the massive portion 4. The first mouth 21a opens into the bottom surface 24 or into the external lateral surface 26. The second mouth 21b opens into the external surface 2a of the connector 2. In operation, the annular groove 23 is at the same pressure as the exterior of the component 1. Alternatively, the first connector 2 may be in a single piece.

The annular groove 23 may be substantially facing another annular groove 23 of a second tubular component 1 mounted with the first tubular component 1, see FIG. 3.

In FIG. 3, the annular grooves 23 are shown empty to facilitate interpretation of the drawing. In the mounted state, the threaded portion 12 of a first connector 2 of a first component 1 interacts with a threaded portion 13 of a second connector 3 of a second tubular component 1. The shoulders 17 of each of the tubular components 1 face each other. The annular grooves 23 of each of the tubular components 1 are substantially radially aligned. The annular grooves 23 of each of the tubular components 1 substantially face each other. The cylinders 22 of each of the tubular components 1 substantially face each other. The internal lateral 25 and external lateral 26 surfaces of each of the tubular components 1 are substantially and respectively radially aligned. The internal lateral 25 and external lateral 26 surfaces of each of the tubular components 1 are substantially and respectively continuous with each other. The interfering fit of two tubular components 1 by makeup via their threaded portions 12, 13 means that the shoulders 17 are in mutual interfering contact.

The tubular component 1 includes the annular coupler 40. The annular coupler 40 is a signal transmission coupler. The annular coupler 40 may be a contactless coupler. The annular coupler 40 may be a capacitive coupler. The annular coupler 40 may be a coupler with electrical contact or direct contact. FIGS. 4 to 14 show examples of contact couplers 40. The annular coupler 40 can transmit energy. The coupler 40 shown in FIGS. 4 and 5 has dimensions suitable for being inserted in the annular groove 23. The annular coupler 40 comprises a ring 50. The annular coupler 40 comprises an insulating support 60. The insulating support 60 is fixed partially around the ring 50 by molecular or mechanical bonding. The molecular bonding may, for example, be adhesion. The annular coupler 40 comprises a principal axis of revolution X2. In the mounted state of the annular coupler 40, the principal axis X2 of the coupler 40 is substantially aligned with the principal axis of revolution X1 of the component 1.

The ring 50 has an annular coupling surface 51. In the coupled state, the annular coupling surface 51 is orientated towards a second annular coupling surface 51 of a second annular coupler 40 located in a second component 1 intended to be assembled with the first component 1. The annular coupling surface 51 may at least partially be an electrical contact surface. The annular coupling surface 51 is substantially radial. The annular surface 51 may be planar. The annular surface 51 may be substantially aligned with the shoulder 17 in the mounted state in the connector 2.

The annular coupling surface 51 of an annular coupler 40 may comprise at least one bevel 42, see FIGS. 8 to 10 and 15 to 17. The bevels 42 are annular. The bevels 42 form substantially tapered surfaces with an axis substantially identical with the principal axis X2. The bevels 42 may be located on the internal and/or external border of the annular coupling surface 51. The bevels 42 of the annular coupling surface 51 are arranged so as to be complementary with the bevels 42 of an annular coupling surface 51 of a complementary second annular coupler 40 of the first tubular component 1. In other words, the assembly formed by assembling two complementary annular couplers 40 is symmetrical in a plane perpendicular to their principal axes X2 with the exception of the bevels 42. The two corresponding annular couplers 40 may be substantially similar with the exception of the bevels 42 and/or have other complementary centering shapes.

The insulating support 60 is annular with an axis that is substantially identical with the principal axis X2. The insulating support 60 comprises an annular concavity. Said annular concavity envelops the ring 50, leaving the annular coupling surface 51 free. Said concavity comprises a surface bonded to the ring 50. The insulating support 60 comprises an inner surface 61. The insulating support 60 comprises an outer surface 62.

The inner surface 61 is a surface of revolution having an axis of revolution substantially identical to that of the principal axis X2, for example a cylindrical section. The radius of said cylindrical section is equal to the small radius of the insulating support 60. In the mounted state, the inner surface 61 is intended to come into contact with the internal lateral surface 25 of the annular groove 23.

The outer surface 62 is a surface of revolution with an axis of revolution substantially identical to the principal axis X2, for example a cylindrical section. The radius of said cylindrical section is equal to the large radius of the insulating support 60. In the mounted state, the outer surface 62 is intended to come into contact with the external lateral surface 26 of the annular groove 23.

The terms "inner" and "outer" are used because the radius of revolution of the outer surface 62 is strictly greater than the radius of revolution of the inner surface 61. The two surfaces, inner and outer, 61, 62 of the insulating support 60 extend substantially parallel to each other. The difference in the radius of revolution between the inner 61 and outer 62 surfaces define the width of the annular coupler 40. This difference in radius is less than the difference in the radius of revolution between the internal lateral surface 25 and the external lateral surface 26 of the annular groove 23.

The insulating support 60 may be bonded to the ring 50. The insulating support 60 may be stuck to the ring 50. The annular coupler 40 has a fluid-tight structure. The insulating support 60 has a deformable structure, with at least one structure for which deformation predominates over volume reduction. The insulating support 60 comprises a deformable material, with at least one material for which deformation predominates over volume reduction. The insulating support may, for example, be principally composed of elastomer. The insulating support 60 may be slightly insulating in order to prevent the accumulation of electrostatic charges, for example with a carbon filler, or it may be highly insulating.

The insulating support 60 comprises a piston surface 70, see FIG. 6. The piston surface 70 is a surface located between the inner 61 and outer 62 surfaces. The piston surface 70 comprises a central portion surrounded by chamfers towards the inner 61 and outer 62 surfaces. Said central portion of the piston surface 70 may be concave. The piston surface 70 is axially opposed to the annular coupling surface 51. The piston surface 70 comprises a zone in the form of a near-circular collar. The coupler 40 comprises a plug 80, see FIGS. 11 and 12. The circularity of the piston surface 70 is interrupted by the plug 80. The plug 80 angularly completes the collar shape of the piston surface 70. The piston surface 70 is a surface of revolution with axis X2. The piston surface 70 connects to the inner surface 61 via its smallest radius rim. The piston surface 70 connects to the outer surface 62 via its largest radius rim. The piston surface 70 is intended to face the bottom surface 24 of the annular groove 23 in the mounted state.

The inner 61 and outer 62 surfaces, the piston surface 70, the coupling surface 51 and the annular coupler 40 are substantially concentric.

The annular coupler 40 may comprise one or more anti-rotation locks 41, see FIGS. 4 and 5. The anti-rotation locks 41 constitute projections from the outer surface 62. The anti-rotation locks 41 in this case are in the form of ribs substantially parallel to the principal axis X2. The anti-rotation locks 41 in this case come out of the outer surface 62 of the insulating support 60. Alternatively or in a complementary manner, the anti-rotation locks 41 may come out of the inner surface 61 and/or out of the piston surface 70. There may, for example, be a total of six anti-rotation locks 41. The anti-rotation locks 41 may be spaced equidistantly over the circumference of the annular coupler 40. The external lateral surface 26 of the annular groove 23 comprises anti-rotation housings 27. The anti-rotation housings 27 comprise recesses, in this case in the external lateral surface 26. In the case of anti-rotation locks 41 coming out of the inner surface 61 and/or the piston surface 70, the anti-rotation housings 27 comprise recesses in the internal lateral surface 25 and/or in the bottom surface 24. The anti-rotation housings 27 correspond in shape with the anti-rotation locks 41 of the annular coupler 40. The interaction between the anti-rotation locks 41 and the anti-rotation housings 27 mean that the annular coupler 40 can be indexed angularly in the annular groove 23. The interaction between the anti-rotation locks 41 and the anti-rotation housings 27 limits the rotation of the annular coupler 40 in the annular groove 23.

In the following paragraphs, the mutual spatial organization of the elements included in the coupler 40 is described in section in a plane comprising the principal axis X2 or longitudinal plane, see FIGS. 7 to 10.

The ring 50 comprises a central conductor 52. The central conductor 52 comprises a conductive material. The central conductor 52 may comprise copper with a low oxygen content and high conductivity. The central conductor 52 may comprise a copper-beryllium alloy. The central conductor 52 may also comprise a low conductivity material, for example stainless steel, on which a layer of conductive material is deposited. The central conductor 52 is located substantially equidistantly from the inner surface 61 and the outer surface 62. The central conductor 52 may be located substantially at the centre of the section of the coupler 40 in a longitudinal plane. The central conductor 52 may comprise the neutral wire of the ring 50. In a contact coupler, the central conductor 52 comprises an electrical contact surface 55. The electrical contact surface 55 is central with respect to the annular coupling surface 51. The central contact surface 55 is disposed in the annular coupling surface 51. In the coupled state, the central contact surface 55 is intended to come into contact with another central contact surface 55 of another corresponding annular coupler 40 disposed in the second tubular component 1.

The ring 50 comprises a dielectric means 54. The dielectric means 54 is composed of a dielectric material. The dielectric means 54 may comprise one or more materials selected from polytetrafluoroethylene (PTFE), perfluoroalkoxide (PFA), polyetheretherketone (PEEK) and polyphenylene sulphide (PPS). The dielectric means 54 envelops the central conductor 52 over the circumference of the coupler 40, leaving the central contact surface 55 of the central conductor 52 free. The shape of the dielectric means 54 matches that of the central conductor 52 apart from the annular coupling surface 51. The dielectric means 54 is in contact with an internal surface, an external surface and a surface axially opposed to the central contact surface 55 of the central conductor 52. The dielectric means 54 electrically isolates the central conductor 52 from its environment with the exception of the central contact surface 55. In longitudinal section, the dielectric means 54 has the shape of a protective, insulating layer for the central conductor 52. Said layer has a pre-selected thickness. Said thickness of the dielectric means 54, in the longitudinal sectional plane, is constant in this case. The dielectric means 54 comprises free surfaces 59. The free surfaces 59 are disposed in the annular coupling surface 51. In a longitudinal sectional plane, the free surfaces 59 are located either side of the central contact surface 55. The free surfaces 59 in this case are aligned with the central contact surface 55. The free surfaces 59 may be slightly set back towards the interior of the ring 50 with respect to the central contact surface 55. In the mounted and coupled state, the free surfaces 59 are located facing other free surfaces 59 of a second annular coupler 40 disposed in the second tubular component 1. The dielectric means 54 provides stability between the central conductor 52 and the remainder of the coupler 40.

The ring 50 comprises a supplemental conductor 53. The supplemental conductor 53 comprises a conductive material.

The supplemental conductor 53 may comprise copper with a low oxygen content and high conductivity. The supplemental conductor may include a copper-beryllium alloy. The central conductor 52 and the supplemental conductor 53 may have a similar composition. The supplemental conductor 53 envelops the dielectric means 54 over the circumference of the coupler 40, leaving the free surfaces 59 free. The supplemental conductor 53 envelops the central conductor 52 at a distance, over the circumference of the coupler 40, leaving the central contact surface 55 free. The supplemental conductor 53 comprises a first supplemental electrical contact surface 56 and a second supplemental electrical contact surface 57. The first and second supplemental electrical contact surfaces 56, 57 are disposed in the annular coupling surface 51. In a longitudinal sectional plane, the supplemental electrical contact surfaces 56, 57 are located either side of the set of free surfaces 59 and the central contact surface 55. The first supplemental electrical contact surface 56 is at a radial distance from the principal axis X2 which is less than the distance separating the second supplemental electrical contact surface 57 from the principal axis X2. The first and/or second supplemental electrical contact surfaces 56, 57 may be aligned with the central electrical contact surface 55 and/or the free surfaces 59.

The dielectric means 54 maintain the central conductor 52 and the supplemental conductor 53 at a selected distance over the circumference of the coupler 40. The dielectric means 54 may act to support said conductors 52, 53 while ensuring their mutual electrical isolation.

In the mounted and coupled state, the first and second supplemental electrical contact surfaces 56, 57 respectively face the first and second supplemental electrical contact surfaces 56, 57 of a second annular coupler 40 disposed in the second tubular component 1.

The insulating support 60 will envelop the supplemental conductor 53 with the exception of the first and second supplemental electrical contact surfaces 56, 57. The bonding surface of the ring 50 with the insulating support 60 belongs to the supplemental conductor 53.

In FIG. 8, starting from the inner surface 61, radially in the thickness of the coupler 40, there is the insulating support 60, the supplemental conductor 53, the dielectric means 54, the central conductor 52, the dielectric means 54, the supplemental conductor 53, the insulating support 60, and the outer surface 62. The annular coupling surface 51 comprises a border of the inner surface 61, a border of the insulating support 60, the first supplemental electrical contact surface 56, a free surface 59, the central contact surface 55, a free surface 59, the second supplemental electrical contact surface 57, a border of the insulating support 60, and a border of the outer surface 62.

In the coupled state of two complementary annular couplers 40, the annular coupling surfaces 51 are in at least partial contact. The complementary annular couplers 40 form a coaxial cable disposed in a closed loop. In other words, the assembly of two complementary annular couplers 40 comprises two central conductors 52 which are completely enveloped by two dielectric means 54, themselves completely enveloped by the two supplemental conductors 53, themselves completely enveloped by the insulating supports 60, see FIGS. 7, 9 and 10.

In one embodiment, in a longitudinal plane comprising the axis X2, the two central conductors 52 of two coupled complementary annular couplers 40 have an oblong section, see FIG. 8. The two dielectric means 54 have an oblong contour around the central conductors 52. The two supplemental conductors 53 have an oblong contour around the dielectric means 54 and central conductors 52. The elongate direction of the section and the oblong contours is substantially parallel to the axis X2. In this case, the profile of each of the supplemental conductors 53 and each of the non-coupled dielectric means 54 is U-shaped.

In another embodiment, in a longitudinal plane comprising the axis X2, the two central conductors 52 of two complementary coupled annular couplers 40 have a disk section. The two dielectric means 54 have a collar-shaped contour around the central conductors 52. The two supplemental conductors 53 have a collar-shaped contour around the dielectric means 54 and the central conductors 52. The profile of each of the supplemental conductors 53 and each of the non-coupled dielectric means 54 have a half-collar shape.

In the coupled state, the supplemental conductors 53 form an electromagnetic shielding for the central conductors 52. The complementarity of the annular couplers 40 in the mounted and coupled state means that the mutual surfaces comprised in the annular coupling surfaces 51 match well. A mutual alignment of the surfaces comprised in the annular coupling surfaces 51 means continuity of the elements included in each of the rings 50. A continuity of the conductor rings 50 improves the electromagnetic shielding of the coaxial cable formed by the set of two complementary coupled annular couplers 40.

The central conductor 52 and the supplemental conductor 53 are mutually isolated by the dielectric means 54 in the circumference of the annular coupler 40. The distance separating the central conductor 52 from the supplemental conductor 53 in the circumference of the annular coupler 40 corresponds to the thickness of the dielectric means 54. This distance may be constant. In the coupled state and for contact couplers, the central conductors 52 of the two corresponding couplers 40 are in electrical contact. This electrical contact is produced by at least partial mutual contact of the two central contact surfaces 55. In the coupled state, the supplemental conductors 53 of complementary annular couplers 40 are in electrical contact. This electrical contact is provided by the mutual paired contact of the supplemental electrical contact surfaces 56, 57 of the two annular couplers 40. In other words, the electrical contact between the central conductors 52 is provided between a pair of central contact surfaces 55. The electrical contact between the supplemental conductors 53 is ensured by two pairs of supplemental electrical contact surfaces 56, 57. Each of the central and supplemental electrical contact surfaces 55, 56, 57 is annular and in at least one plane which is substantially perpendicular to the axis X2, see FIG. 4.

The central and supplemental electrical contact surfaces 55, 56, 57 form concentric circular rings. The centre of the electrical contact surfaces 55, 56, 57 is included in the axis X2. The diametrically increasing order of the annular electrical contact surfaces 55, 56, 57 is as follows: the first supplemental electrical contact surface 56, then the central electrical contact surface 55, then the second supplemental electrical contact surface 57, see FIG. 4. A pair of annular couplers 40 in the coupled state forms a coaxial closed loop wire in the form of a toroid with a circular or oblong section. The section may also be rectangular or a mixture of the shapes discussed above.

Figure 14:
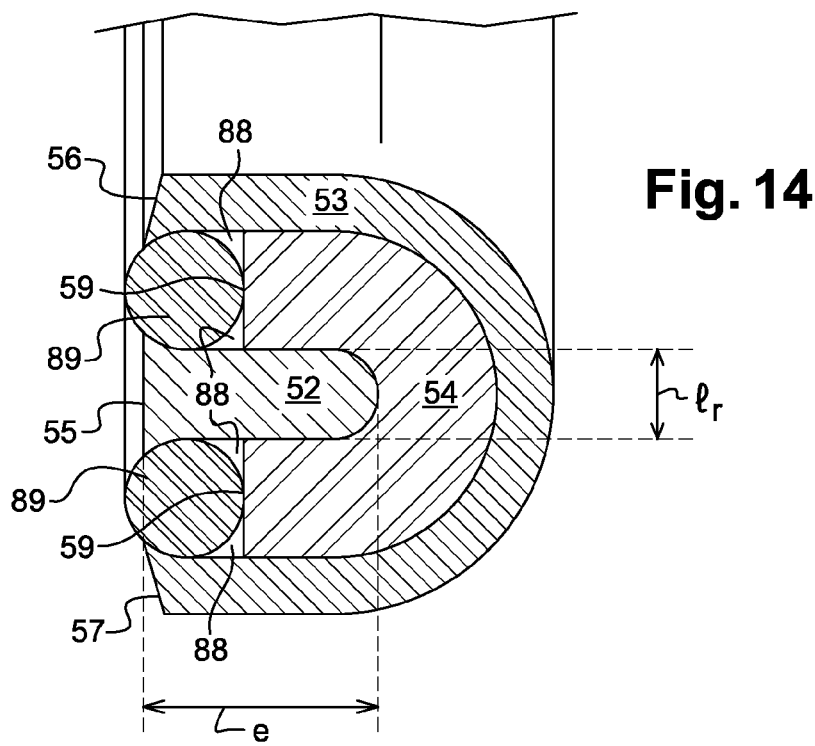
FIG. 14 is a diagrammatic half-view in longitudinal section of a coupler.

In one embodiment, at least one of the couplers 40 may comprise at least one annular seal 89, for example toroidal or flange-shaped, see FIG. 14. In an asymmetrical embodiment, a single coupler of the pair comprises at least one annular seal 89. Elements similar to those in FIG. 8 have the same reference numerals. The mutual disposition of the central 52 and supplemental conductors 53 and the dielectric means 54 is similar to that of FIG. 8. In contrast, the arms of the U of the profile of the dielectric means 54 are shorter than the arms of the U of the profile of the supplemental conductor 53 and shorter than the central conductor 52. In contrast to the embodiment of FIG. 8, the free surfaces 59 are not aligned with the contact surfaces 55, 56, 57 and do not form part of the annular coupling surface 51. The axial setback of the dielectric means 54 with respect to the central 52 and supplemental 53 conductors form annular cavities 88. Further, the ends, located at the side of the annular coupling surface 51, of the central 52 and supplemental 53 conductors are substantially enlarged radially so as to increase the contact surfaces 55, 56, 57 overhanging the cavities 88. These enlargements form reductions in the opening of the cavities 88 close to the coupling surface 51.

Each annular seal 89 is at least partially disposed in a cavity 88. Each annular seal 89 in the free state projects from the annular coupling surface 51. Each annular seal 89 in the free state is held in a cavity 88 by radial enlargements of the central 52 and supplemental 53 conductors. Each annular seal 89 comprises a high elasticity material. During making up of two components, each annular seal 89 is compressed along the principal axis X1. During makeup of the two components, the annular seal 89 is deformed in directions perpendicular to the principal axis X1 into the spaces available in the cavities 88. Expansion of the annular seal 89 during makeup means that fluids that have been able to infiltrate into the vicinity of the contact surfaces are expelled. Said fluids may include salt water, for example seawater, which is damaging to the electrical insulation between the central 52 and supplemental 53 conductors. Said fluids may include mud containing salt water. Compressing the annular seal 89 will rupture any film of fluid between the central conductor 52 and the supplemental conductor 53 even if said fluid is not entirely expelled from the cavity 88. A solution to continuity is obtained. The contact surfaces 55, 56, 57 partially cover the annular seal 89, blocking translation of the circular seal 89 beyond the annular coupling surface 51.

Figure 17:
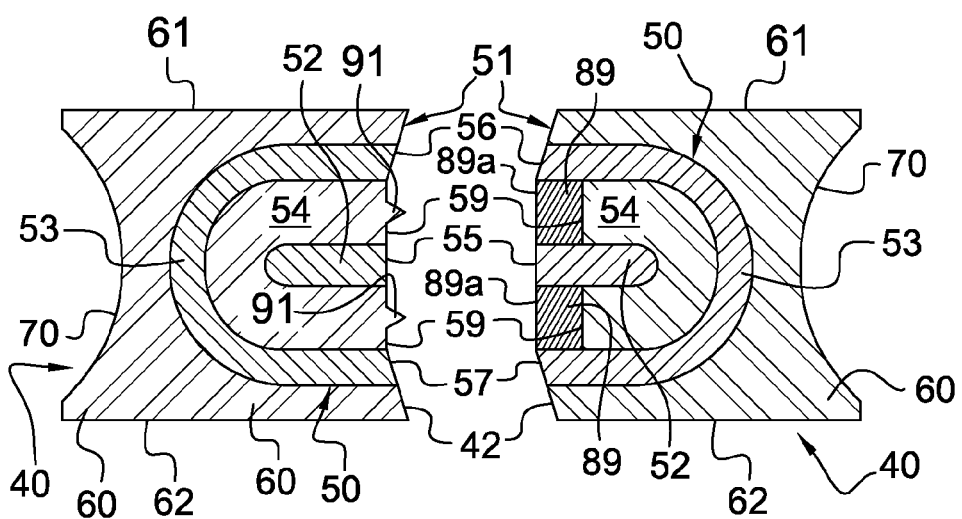
FIG. 17 is a view of a variation of FIG. 8.

In one embodiment shown in FIG. 17, one of the couplers 40 of the pair comprises at least one annular seal 89. The annular seal 89 has a substantially rectangular section. The annular seal 89 fills the space axially between the free surface 59 of the dielectric means 54 and the coupling surface 51 and radially between the central conductor 52 and the supplemental conductor 53. In the non-coupled state, a free annular surface 89a of the annular seal 89 opposite to the dielectric means 54 is substantially flat. The free annular surface 89a of the annular seal 89 forms part of the annular coupling surface 51. The dielectric means 54 of the complementary coupler 40 comprises at least one annular rib 91. The annular rib 91 projects from the annular coupling surface 51 axially in the direction of the coupler 40 comprising the annular seal 89. On coupling, the annular rib 91 embeds itself in the material of the annular seal 89 of the coupler 40 located facing it, and deforms it. On coupling, the annular rib 91 compresses the annular seal 89 axially. Deforming the annular seal 89 by the action of the annular rib 91 improves the electrical insulation. The annular rib 91 is formed as a single piece with the dielectric means 54. The annular rib 91 comprises the same material as the dielectric means 54. The annular rib 91 in this case has a substantially equilateral triangular section. The annular rib 91 occupies a portion of the free surface 59 in the range 15% to 40%.

Figure 11:
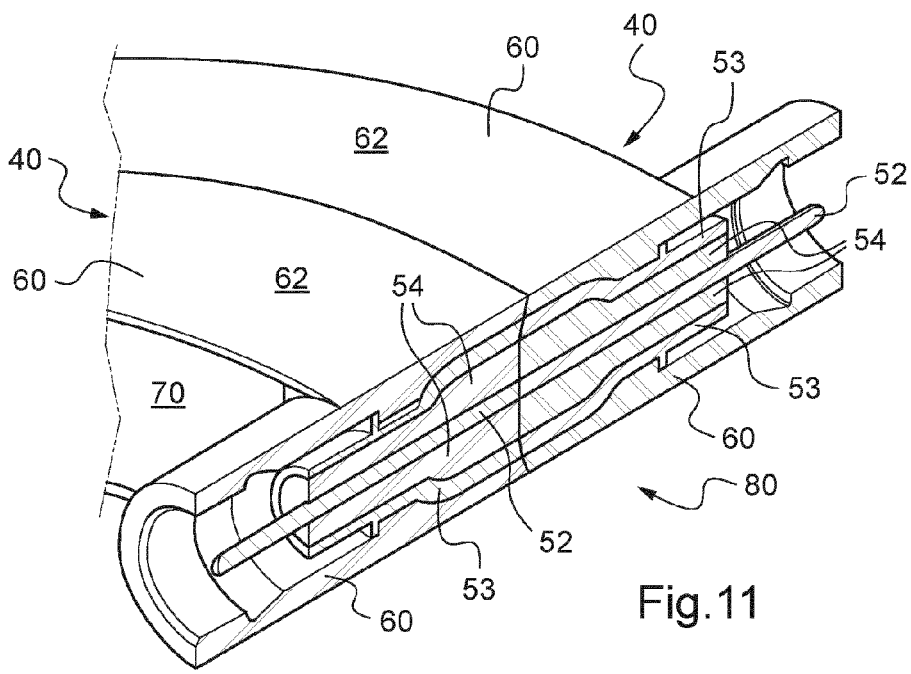
FIG. 11 is a detailed view of FIG. 6.
Figure 12:
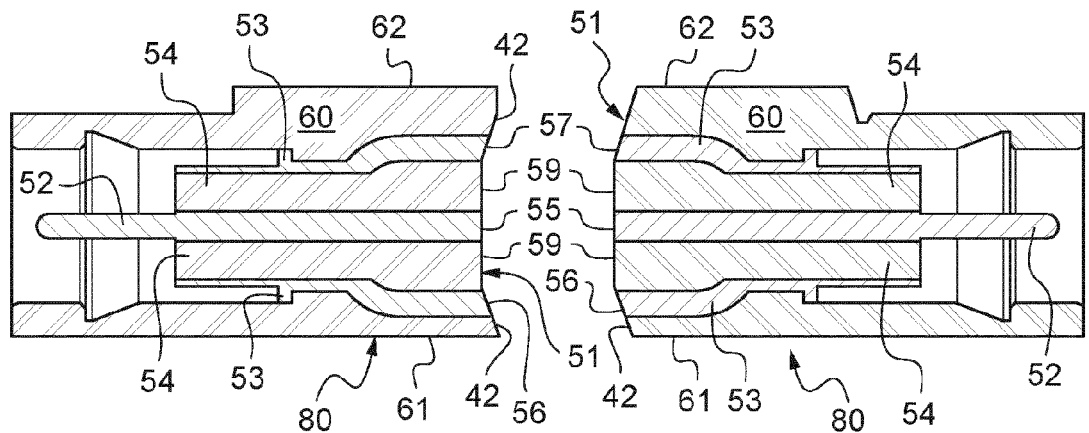
FIG. 12 is a longitudinal sectional view passing through the plugs of the two couplers of FIG. 11 disposed face to face.

The plug 80 constitutes a female connector for connecting the coupler 40 with a male end or jack of a cable (not shown) disposed in the component 1 and extending from the first to the second connector 2, 3, see FIGS. 11 and 12. The plug 80 comprises a male protuberance of the central conductor 52 in a direction substantially parallel to the axis X2 and coming out from the ring 50 towards the side opposite to the annular coupling surface 51. The plug 80 comprises a protuberance of the dielectric means 54 in a direction substantially parallel to the axis X2 and coming out from the ring 50 towards the side opposite to the annular coupling surface 51. The plug 80 comprises a protuberance of the supplemental conductor 53 in a direction substantially parallel to the axis X2 and coming out from the ring 50 towards the side opposite to the annular coupling surface 51. Said protuberances are arranged to retain the electrical isolation of the central 52 and supplemental 53 conductors by the dielectric means 54. The plug 80 comprises a protuberance of the insulating support 60 in a direction substantially parallel to the axis X2 and coming out from the piston surface 70 of the coupler 40 towards the side opposite to the annular coupling surface 51. The protuberance of the insulating support 60 is tubular, arranged to retain the seal of the housing of the cable and the plug/jack connection with respect to the annular groove 23.

The protuberance of the central conductor 52 is longer than those of the supplemental conductor 53 and the dielectric means 54. The protuberance of the dielectric means 54 is at least equal to that of the supplemental conductor 53. Said protuberances are arranged such that the shapes of their free ends correspond with the end of the cable.

The protuberance of the central conductor 52 is at least partially enveloped by the protuberance of the dielectric means 54. The protuberance of the dielectric means 54 is at least partially enveloped by the protuberance of the supplemental conductor 53. The protuberance of the supplemental conductor 53 is at least partially enveloped by the protuberance of the insulating support 60.

The bore of the protuberance of the insulating support 60 comprises a reduced diameter zone at a distance from the annular coupling surface 51. The protuberance of the supplemental conductor 53 comprises an annular rib from its external surface. Said rib and said reduced diameter zone block the ring 50 in translation in the direction of the coupling surface 51 with respect to the insulating support 60, especially when plugging/unplugging the cable.

Beyond said rib, the diameter of the bore of an end portion of the protuberance of the insulating support 60 is strictly larger than the external diameter of the protuberance of the supplemental conductor 53, leaving a space. The space left allows the end of the cable to be plugged in and connected.

Beyond said rib, the bore of the protuberance of the insulating support 60 comprises an annular groove. Said annular groove comprises a radial shoulder arranged to interact with the end surfaces of the cable to prevent accidental unplugging of the annular coupler 40 with said cable. This interaction may, for example, be of the snap fit type. The plug 80 is arranged to match the shape of the end of the cable.

The coaxial cable disposed in a closed loop formed by coupling two complementary annular couplers 40 may form a high frequency (or HF) coupling. The ring 50 comprises two conductors 52, 53 separated by a dielectric means 54. The first and second supplemental electrical contact surfaces 56, 57 are distinct. The first and second supplemental electrical contact surfaces 56, 57 are at the same potential.

Two complementary couplers 40 in this case form an assembly of HF contact couplers for drilling components, especially at frequencies from approximately 100 kHz to 20 MHz. Said assembly comprises a coaxial cable disposed in a closed loop with axis X2. A straight line intersects with the axis X2 and defines a surface by rotating about said axis X2. Said straight line is inclined at an angle in the range 0° to 90° from a radial plane passing through said coaxial cable. Said surface defines at least a part of the coupling surfaces 51 of the first and second couplers 40.

A set of HF contact couplers 40 for drilling component 1 comprises a coaxial cable disposed in a closed annular loop with axis X2. One surface is defined by a straight line generating a cone with an axis that is substantially identical with said axis X2. Said surface passes through said coaxial cable and defines at least a portion of the coupling surfaces 51 of a first and a second coupler 40 of said assembly. The angle between said straight line and said axis X2 may approach 90° via lower values. The value of 90° may in this case be reached and said surface is defined by a cone with a flat top, in other words a plane.

Figure 10:
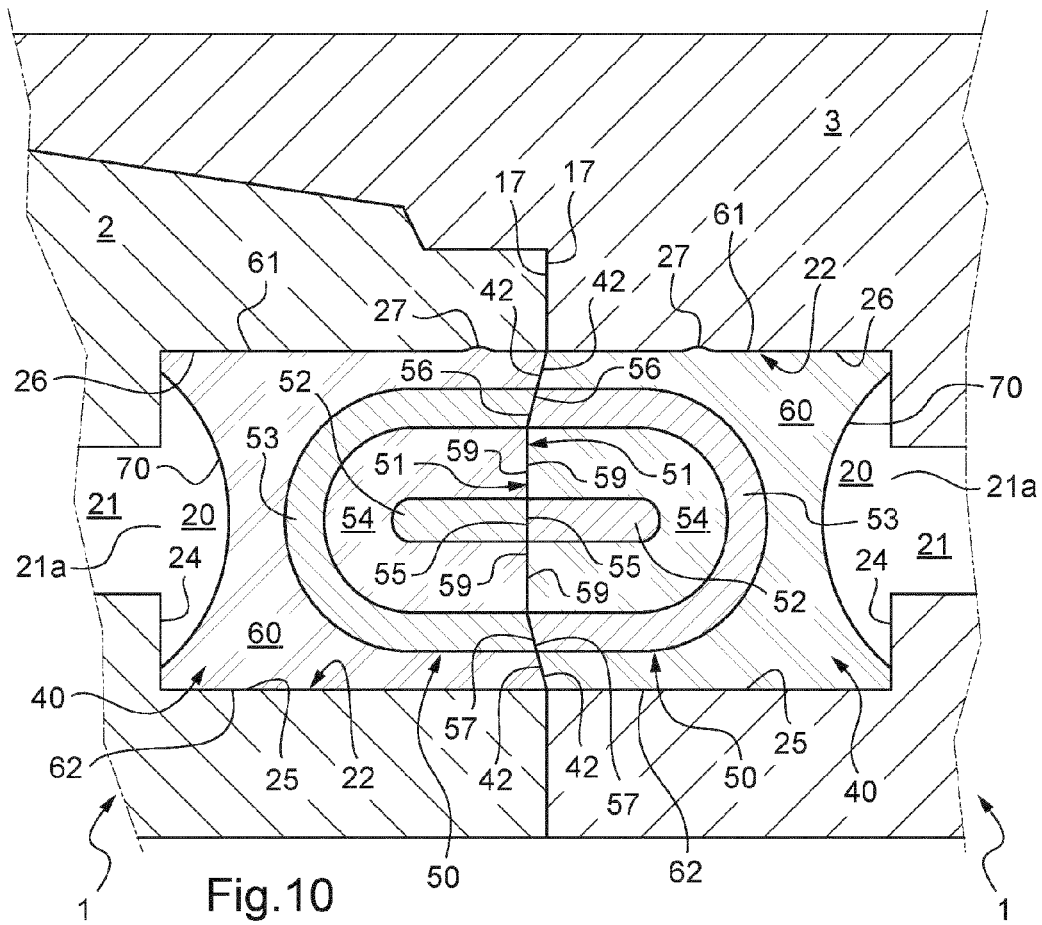
FIG. 10 is a half-view corresponding to FIG. 3 showing a pair of mounted and coupled couplers.

In the mounted state, see FIG. 10, the annular coupler 40 is installed in the annular groove 23. The coupler 40 is at least partially disposed in the cylinder 22. The inner surface 61 of the annular coupler 40 faces the internal lateral surface 25 of the annular groove 23. The outer surface 62 of the annular coupler 40 faces the external lateral surface 26 of the annular groove 23. The piston surface 70 of the annular coupler 40 faces the bottom surface 24 of the annular groove 23. The annular coupling surface 51 of the annular coupler 40 may be substantially parallel to the shoulder 17 of the first connector 2. The inner surface 61 of the annular coupler 40 may be in contact with the lateral internal surface 25 of the annular groove 23. The outer surface 62 of the annular coupler 40 may be in contact with the external lateral surface 26 of the annular groove 23. In general, the dimensions of the coupler 40 and the dimensions of the annular groove 23 are selected so as to match.

Figure 15:
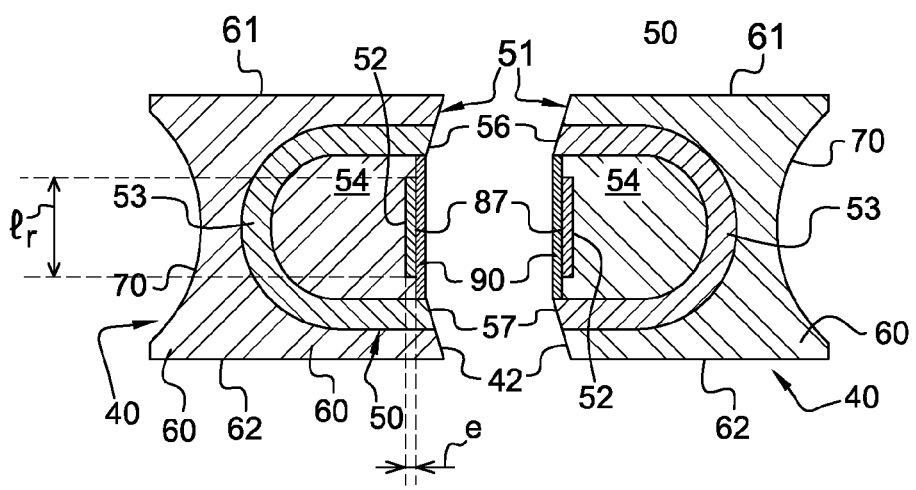
FIG. 15 is a view corresponding to FIG. 8 of a pair of capacitive couplers.

In the embodiment of FIG. 15, the coupler is capacitive. The elements that are similar to those of the contact coupler have the same reference numerals as in FIG. 8. The capacitive coupler further comprises a dielectric layer 90. The dielectric layer 90 covers at least a portion of the central conductor 52 and the dielectric means 54, on the side of the annular coupling surface 51. The structure of the capacitive couplers is similar to that of the contact couplers described above, the only difference being that they do not have the contact surface 55 and the free surfaces 59. In FIG. 15, the shape of the central conductors 52 is structurally distinct from that of the preceding figures. In fact, in this case the central conductor 52 has the form of a hollowed disk with a thickness "e" measured along the longitudinal axis of the tubular component which is very substantially inferior to its radial width "1r", measured perpendicular to this longitudinal axis. The radial width "1r" may be in the range 2.5 to 100 times the thickness "e". As an example for the radial width in this embodiment, the radial width "1r" is in the range 5 to 10 mm and its longitudinal thickness "e" is in the range 10 μm to 500 μm, for example of the order of 100 μm.

However, in FIGS. 6 to 10, 13, 14 and 17, the central conductor 52 substantially represents a hollowed disk but with a longitudinal thickness "e" which is very substantially larger than its radial width "1r". In these embodiments, where central conductors are in direct contact, the thickness "e" may be in the range 2.5 to 100 times the radial width "1r".

The longitudinal thickness "e" of the central conductor 52 and its radial width "1r" are determined in longitudinal sectional planes of the coupler not comprising the plug 80, these longitudinal sectional planes passing through the longitudinal axis of the tubular component and through at least one radius of this tubular component.

The ends of the central conductor 52 and the dielectric means 54 located on the side of the annular coupling surface 51 are covered with the dielectric layer 90. The radial width of the central conductor 52 represents at least 50%, preferably in the range 60% to 80% of the radial width of the dielectric layer 90. The radial width of the central conductor 52 represents at least 50%, preferably in the range 60% to 80% of the radial width of the dielectric layer 90. The radial width of the central conductor 52 may represent at least 50%, preferably in the range 60% to 80% of the distance between the electrical contact surfaces 56 and 57 of the supplemental conductor 53.

The ends of the central conductor 52 and the dielectric means 54 located on the side of the annular coupling surface 51 are thus isolated fluid-wise from the exterior of the coupler. The dielectric layer 90 of a coupler 40 is arranged to come into interfering contact with the dielectric layer 90 of a corresponding coupler 40 in the mounted state. The thickness of the dielectric layer 90 is substantially constant. Because of its geometry and its structure, the dielectric layer 90 participates in improving the reproducibility and constancy of the distance between the central and supplemental conductors 52, 53 of two couplers in the coupled state. The end located on the side of the annular coupling surface 51 of the central conductor 52 covered with the dielectric layer 90 may also be radially enlarged, the dielectric means 54 being concomitantly thinned. The ends of the central conductors 52 of two couplers in the coupled state interact with the electric field. The central conductors 52 form an electrical capacitance. The central conductors 52 form separated electrodes. The surface of each central conductor 52 in contact with the dielectric layer 90 orientated towards the complementary coupler forms an electrode surface 87. The central conductors 52 are isolated fluid-wise from the exterior of the coupler, and so risks of electrical contact with the supplemental conductors 53 by the presence of conductive fluid are reduced.

This embodiment may be combined with the annular seal 89. Two annular seals 89 and the dielectric layer 90 may be formed in a single part. The two annular seals 89 are arranged in two concentric rings with different diameters connected via a dielectric film. The dielectric film constitutes a portion of the dielectric layer 90 covering the end, located at the side of the annular coupling surface 51, of the central conductor 52.

Figure 16:
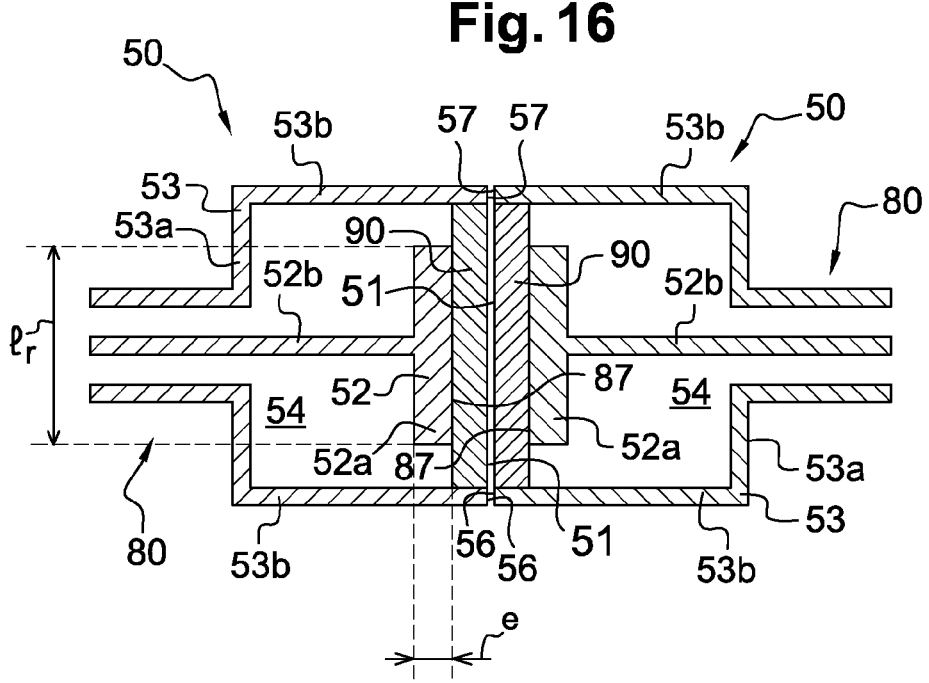
FIG. 16 is a view of a variation of FIG. 15.

In the embodiment of FIG. 16, the coupler is capacitive. FIG. 16 is a half-schematic in longitudinal section passing through the plugs 80 of a pair of couplers 40. The central conductors 52 have a T-shaped section in this sectional plane. The central conductors 52 comprise a radially orientated cross-bar 52a of the T and an axially orientated foot 52b of the T. The cross-bar 52a of the T is annular in shape and has a longitudinal thickness "e" along the longitudinal axis of the tubular component which is inferior to its radial width "1r". The radial width "1r" may be at least 4 times greater than the thickness "e".

The foot 52b is not annular and extends axially to form part of the plug 80. With such a configuration, the electrode surface area is high, and hence the capacitance is high, especially more than 500 pF, preferably more than 800 pF. The dielectric layer 90 may comprise PEEK. The dielectric layer 90 may comprise zirconia. The dielectric layer 90 may have a permittivity of more than 20, preferably more than 25, for example of the order of 28 to 40. The transmission band may be as high as 27 MHz, preferably 31 MHz. The transmission band is higher with increased surface area, with increased permittivity of the dielectric and with decreased thickness of the cross-bar 52a of the T of the central conductors 52. Any infiltration of salt water or mud between the dielectric layers 90 of the couplers 40 of a coupled pair has a very low or even favourable influence on the transmission band and signal attenuation due to the high permittivity of salt water. In axial section, the dielectric means 54 has a polygonal shape with right angles. In axial section, the supplemental conductor has a rectangular shape. The supplemental conductor 53 comprises an annular wall 53a opposite the dielectric layer 90 and two cylindrical walls 53b. The small thickness in the axial direction, which is enlarged in the drawing for clarity, of the cross-bar 52a of the T generates a small contribution to said parasitic capacitance of the zone radially located between the cross-bar 52a of the T and each of the cylindrical walls 53b of the supplemental conductor 53. The two cylindrical walls 53b are concentric with different radii of revolution and connected by the annular wall 53a.

In the mounted state, the space located between the bottom surface 24, the internal lateral surface 25, the external lateral surface 26, and the piston surface 70 form a chamber 20, see FIG. 10. In the longitudinal direction, the space located between the cylinder 22 and the piston surface 70 forms the chamber 20. The chamber 20 is physically defined in the mounted state of the coupler 40 in the component 1. The disposition of the channel 21, and in particular the disposition of the first mouth 21a, are selected such that in the mounted position, the mouth 21a remains clear in the annular coupler 40. In the mounted state, the chamber 20 is in fluid communication with the exterior of the chamber 20 via the channel 21. The chamber 20 is maintained in communication with a pressure external to the chamber 20 irrespective of the longitudinal position of the coupler 40. The channel 21 balances the pressure between the chamber 20 and the exterior of the chamber 20. The term "exterior of the chamber 20" designates the exterior of the component 1 or the space located in the bore of the component 1, see FIG. 2.

One of the surfaces defining the chamber 20 may be a concave surface. The piston surface 70 and/or the bottom surface 24 may be concave. The inner surface 61 and the internal lateral surface 25 may be displaced with respect to each other over a predetermined course, for example of more than 0.1 mm and less than 40 mm. The outer surface 62 and the external lateral surface 26 may be displaced with respect to each other over a predetermined course, for example more than 0.1 mm and less than 40 mm. The coupler 40 is movable in translation substantially parallel to the axis X1 in the cylinder 22. The coupler 40 is movable in translation in the first connector.

The coupler 40 forms a piston in the cylinder 22. In the mounted and coupled state, the equal pressure between the chambers 20 and the exterior of the chambers 20 provides for equal pressure between each of the opposed axial ends of the annular couplers 40.

Figure 13:
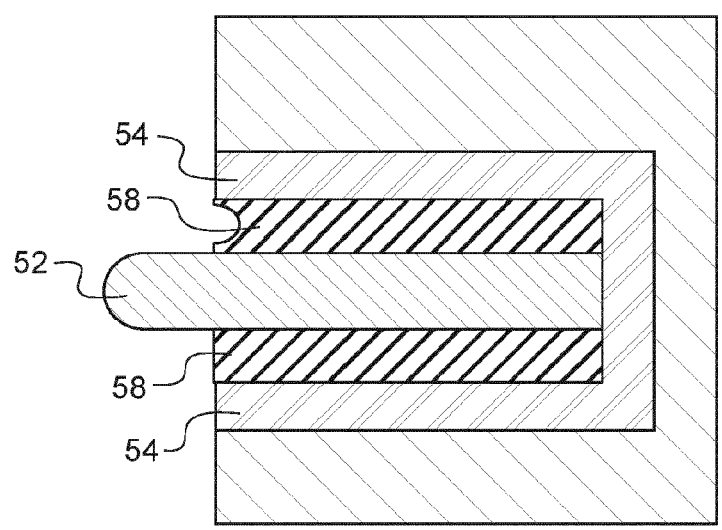
FIG. 13 is a diagrammatic view of a coupler.

In a variation, shown in FIG. 13, the annular coupler 40 may further comprise a sacrificial anode 58. The sacrificial anode 58 comprises a supplemental layer in a longitudinal sectional plane of the coupler 40 containing the axis X2. The sacrificial anode 58 is disposed between the central conductor 52 and the dielectric means 54 and/or between the supplemental conductor 53 and the dielectric means 54. The sacrificial anode 58 is included in the ring 50. The sacrificial anode 58 is composed of a material with a lower electrochemical potential than the electrochemical potential of the central conductor 52 and/or the supplemental conductor 53, in operation and also at rest. The sacrificial anode 58 may, for example, be composed of zinc, magnesium and/or aluminium to protect the conductors 52, 53 which are copper-based. In operation, the sacrificial anode 58 is altered by redox phenomena instead of the central conductor 52 and/or the supplemental conductor 53. This provides cathodic protection.

Upon assembly of two tubular components 1, each of the annular couplers 40 disposed in the respective annular groove 23 may be mounted with the annular coupling surface 51 projecting slightly from the shoulder 17. Making up the two tubular components 1 may be concomitant with cleaning by mutual friction of the two annular coupling surfaces 51. The anti-rotation locks 41 and the anti-rotation housings 27 prevent a coupler 40 from being driven in rotation about the axis X1 by the corresponding coupler 40 during said makeup.

Equilibrated pressure mounting of the annular couplers in the connectors of the tubular components is provided. Equilibrated pressure mounting of two couplers constituting a pair of couplers at one connection means that pressure variation stresses provoking the relative displacement of the annular couplers in a connection in operation can be dispensed with.

The distance between two couplers is better controlled. The Applicant has observed during its studies that precise control of the stability of the distance between the couplers in operation favours good signal transmission quality.

In one embodiment, astonishingly, it is preferable in some cases to control the distance between the annular couplers at a junction rather than to try and reduce that distance. A slight spacing of the two couplers could be allowed, for example of the order of 200 micrometers, to reduce the variance in the spacing in a batch of couplers. Controlling the distance means that the reproducibility of mounting can be improved along with that of the transmission performances of a coupling. Homogenization of the performances of the set of couplings is particularly beneficial in a single drill stem comprising a multitude of couplings. This homogenization of itself improves the performance.

Using a coupler for a coaxial type tubular component facilitates the transmission of data at high frequencies of more than 100 kHz and preferably more than 3 MHz, for example in bands from 30 MHz to 30 GHz. The quality of the data transmission is increased by an amount heretofore unimaginable by technicians in the field. The invention can thus be used on the one hand to allow the transmission of information at high frequency and on the other hand to obtain reproducible performances that until now have not been foreseen.

The invention is not limited to the examples of processes and apparatus described above given solely by way of example, but it encompasses all variations which the skilled person could foresee in the context of the claims below.

The invention claimed is:

1. A pair of first and second HF contact couplers for components for drill stems, each of the first and second couplers comprising:
    a central conductor;
    a supplemental conductor and
    an annular dielectric means disposed between the central and supplemental conductors;
    the central and supplemental conductors being isolated from each other;
    the supplemental conductor comprising two electrical contact surfaces;
    the central conductor comprising an electrical contact surface, the central conductors of the first and second couplers being in electrical contact in a coupled state;
    the supplemental conductors of the first and second couplers being in electrical contact, in the coupled state, the supplemental conductors surrounding the central conductors, the supplemental conductors forming, in a mounted state, shielding for the central conductors, each of the supplemental conductors being surrounded by an insulating support to electrically insulate the supplemental conductor from components of the drill stem,
    wherein at least one of the first and second couplers further comprises at least one annular seal disposed at least partially in a cavity, the cavity being formed by axially setting back the annular dielectric means with respect to the central and supplemental conductors.

2. A pair of couplers according to claim 1, in which the annular couplers in the coupled state form a coaxial cable in a shape of a body of revolution.

3. A pair of couplers according to claim 1, in which the shielding is electromagnetic.

4. A pair of couplers according to claim 1, in which the central conductors are annular in shape and have a longitudinal thickness which is greater than their radial width, or 2.5 to 100 times greater.

5. A pair of couplers according to claim 1, in which a profile of the supplemental conductors, in section in a longitudinal plane, is U-shaped.

6. A pair of couplers according to claim 1, in which a profile of the supplemental conductors, in section in a longitudinal plane, is closed in the coupled state.

7. A pair of couplers according to claim 1, in which the dielectric means has a constant thickness in an longitudinal sectional plane.

8. A pair of couplers according to claim 1, in which a profile of the dielectric means, in section in a longitudinal plane, is U-shaped.

9. A pair of couplers according to claim 1, in which a profile of the dielectric means, in section in a longitudinal plane, is closed in the coupled state.

10. A pair of couplers according to claim 1, in which the supplemental conductors are each surrounded by an insulating support leaving an annular coupling surface free.

11. A pair of first and second capacitive HF couplers for components for drill stems, each of the first and second couplers comprising:
- a central conductor;
- a supplemental conductor; and
- an annular dielectric means disposed between the central conductor and the supplemental conductor;
- the central conductor and the supplemental conductor being isolated from each other;
- the supplemental conductor comprising two electrical contact surfaces;
- the central conductor comprising an electrode surface;
- each of the central conductors of the first and second couplers being in remote electrical interaction in a coupled state, each of the supplemental conductors of the first and second couplers being in electrical contact in the coupled state, the supplemental conductors surrounding the central conductors;
- the supplemental conductors forming, in a mounted state, shielding for the central conductors, the central conductors being annular in shape with a longitudinal thickness less than their radial width,
- at least one of the first and second couplers further comprises at least one annular seal disposed at least partially in a cavity, the cavity being formed by axially setting back the annular dielectric means with respect to the central and supplemental conductors.

12. A pair of couplers according to claim 11, in which the central conductor has a T-shaped cross section.

13. A pair of couplers according to claim 12, in which the central conductor comprises an annular metallized layer.

14. A pair of couplers according to claim 11, in which the radial width is in the range of 2.5 to 100 times the longitudinal thickness.

* * * * *